United States Patent [19]
Suzuki

[11] 4,272,686
[45] Jun. 9, 1981

[54] APPARATUS FOR CONVERTING HYDRAULIC ENERGY TO ELECTRICAL ENERGY

[76] Inventor: Kunio Suzuki, 3615 Sierra Dr., Honolulu, Hi. 96816

[21] Appl. No.: 133,672

[22] Filed: Mar. 25, 1980

[51] Int. Cl.³ .................................... F03B 13/08
[52] U.S. Cl. ............................. 290/54; 290/43; 416/DIG. 4
[58] Field of Search ............... 290/42, 43, 53, 54; 416/60, DIG. 4

[56] References Cited
U.S. PATENT DOCUMENTS

| | | | |
|---|---|---|---|
| 255,312 | 3/1882 | Maxim . | |
| 548,930 | 10/1895 | Sargent . | |
| 864,967 | 9/1907 | Hammond . | |
| 1,002,676 | 9/1911 | Gray . | |
| 1,299,151 | 4/1911 | Ebert | 416/60 |
| 1,582,715 | 4/1926 | Wensley . | |
| 1,813,107 | 7/1931 | Allner . | |
| 2,097,166 | 10/1937 | Stone | 219/39 |
| 2,097,286 | 10/1937 | McGee | 290/54 |
| 2,222,790 | 11/1940 | Scharrel | 290/54 |
| 2,276,714 | 3/1942 | Brown | 290/54 |
| 2,436,683 | 4/1945 | Wood, Jr. | 290/54 |
| 2,444,415 | 7/1948 | Beeson | 290/52 |
| 2,481,222 | 9/1949 | Jones | 290/52 |
| 2,537,530 | 1/1951 | Hofman . | |
| 2,652,690 | 9/1953 | Labriola et al. | 60/55 |
| 2,929,937 | 3/1960 | Kroger | 290/52 |
| 2,962,599 | 11/1960 | Pirkey | 290/4 |
| 2,965,764 | 12/1960 | Nichols | 290/40 |
| 3,143,656 | 8/1964 | Nichols | 290/40 |
| 3,184,218 | 5/1965 | Hochwalt et al. . | |
| 3,372,645 | 3/1968 | Willi . | |
| 3,485,576 | 12/1969 | McRae et al. . | |
| 3,683,177 | 8/1972 | Veloz | 250/43 |
| 3,750,001 | 7/1973 | McCloskey | 290/52 |
| 3,984,698 | 10/1976 | Brewer | 290/54 |
| 4,001,597 | 1/1977 | Graff | 290/53 |
| 4,122,381 | 10/1978 | Sturm | 290/52 |
| 4,134,024 | 1/1979 | Wiseman | 290/52 |
| 4,142,367 | 3/1979 | Guisti | 60/325 |

Primary Examiner—S. J. Witkowski
Assistant Examiner—Shelley Wade
Attorney, Agent, or Firm—Richards, Harris & Medlock

[57] ABSTRACT

An improved electric power plant (10) includes a water turbine (30) and a drive wheel (34) contained within a housing (22) for converting hydraulic energy to electrical energy. The housing (22) includes openings (90) and (102) for connecting the power plant (10) to a water line (12) or to a sewer line (18) for operating the turbine (30) in either an undershoot or overshoot condition. A plurality of reversible vanes (94) are removably attached to the perimeter of the water turbine (30) for operating the turbine in either an undershoot or overshoot condition. A bypass line (16) extends from the inlet pipe to the housing (22) to the outlet pipe to provide a means for repairing the power plant (10) without interrupting water or sanitary sewer service. The main electrical generator (70) is energized through a belt (72) driven by its engagement with the drive wheel (34). Ultraviolet ray lights (78) and an ozone generator (80) are included within the housing (22) to eliminate bacteria and to reduce odors. A plurality of the power plants (10) may be connected to a central power distribution center (14) for the storage and distribution of the electricity generated by this plant.

10 Claims, 5 Drawing Figures

APPARATUS FOR CONVERTING HYDRAULIC ENERGY TO ELECTRICAL ENERGY

BACKGROUND ART

Electrical energy is an essential form of energy for meeting the energy demands of an industrialized society. Electrical energy may be generated from converting other available sources of energy to electricity, such as geothermal energy, hydraulic energy, solar energy, nuclear energy and the combustion of fossil fuels such as coal and oil. The particular energy source best suited for powering an electrical generating unit is dependent upon a number of factors, including the availability of a dependable supply of such energy at a reasonable price, the existing state of technology for converting this energy to electrical energy, the economics in converting this source of energy into electrical energy, as well as health safety and environmental considerations. Hydroelectric power generating stations have long been attractive for producing electrical energy, and it offers many advantages over other energy sources for generating electricity. However, hydroelectric power installations have generally been available only in those geographical areas where there is a sufficient headwater site.

Another type of hydroelectric power installation which is well known in the art is the generation of electricity from water or oil flowing through a pipeline. U.S. Pat. No. 4,122,381 discloses one such type of hydroelectric power station for the generation and storage of electrical energy for residential use. U.S. Pat. No. 4,134,024, entitled "Method and Apparatus for Generating Electricity from the Flow of Fluids Through a Well" discloses another type of hydroelectric power station, a fluid driven motor positioned in a pipeline to drive a generator for producing electricity to heat the fluid in the pipe to prevent its freezing.

The hydroelectric power installations presently known include complex designed water turbines. The water turbines utilized in such prior art devices are not well suited for use in either a water system or sanitary sewer line where water or sewage services cannot be interrupted for regularly scheduled or emergency repairs.

A need has thus arisen for an improved hydroelectric power station for commercial or residential use in water lines and sanitary sewer lines which provides a clean and efficient means for generating electrical energy from the untapped hydraulic energy from water pipelines, sanitary sewer lines and the like.

DISCLOSURE OF THE INVENTION

In accordance with the present invention, an improved hydroelectric power installation is provided for generating electrical energy from the energy available from water lines and sanitary sewer lines or other pipelines having a flowing fluid. In accordance with the present invention, a hydroelectric power installation is provided for generating electricity from the fluid energy available from a water line or sanitary sewer line. The apparatus includes a water wheel and turbine drive wheel axially mounted upon a central axle and enclosed within a housing to provide access to the water wheel and drive wheel for necessary repairs and maintenance. An electrical generator is driven by a power belt engaging the drive wheel. The housing for the water turbine has two openings formed through the housing for selectively connecting the water turbine for overshoot or undershoot operation. Deflecting cups are secured to the outer rim of the water wheel for imparting rotational motion to the shaft connected to the power drive wheel. The deflection cups are mounted on the perimeter of the water wheel and they may be replaced or reversed by access through a removable side panel.

In accordance with another aspect of the invention, an automatic valve actuated bypass line extends between the inlet and outlet of the water wheel to provide continuous service of the water line and sanitary sewer line during scheduled or emergency maintenance work on the hydroelectric power plant. Valve means is included for automatically draining any fluids spilled into the chamber housing the power drive wheel. Further, ozone lights and ultraviolet ray lights may be included within the drive wheel compartment or water wheel compartment for environmental protection against pollution and for killing bacteria and reducing odors. The ultraviolet and ozone generators may be energized by electricity generated from the hydroelectric power plant.

In accordance with another aspect of the present invention, a plurality of hydroelectric power installations are connected at various points along a water line or sanitary sewer line for generating electrical energy transmitted to a central power plant for storage and/or distribution to an electrical network fed by such a central power station. A bypass line is associated with the inlet and outlet to the water turbine for each of the hydroelectric plants, such that removal of one of the power plants from the line allows fluid energy to pass for energizing the remaining power plants on the line while not interrupting the water or sanitary sewer service.

BRIEF DESCRIPTION OF DRAWINGS

A more complete understanding of the invention and its advantages will be apparent from the following Detailed Description taken in conjunction with the accompanying Drawings in which.

DETAILED DESCRIPTION

Figure 1:
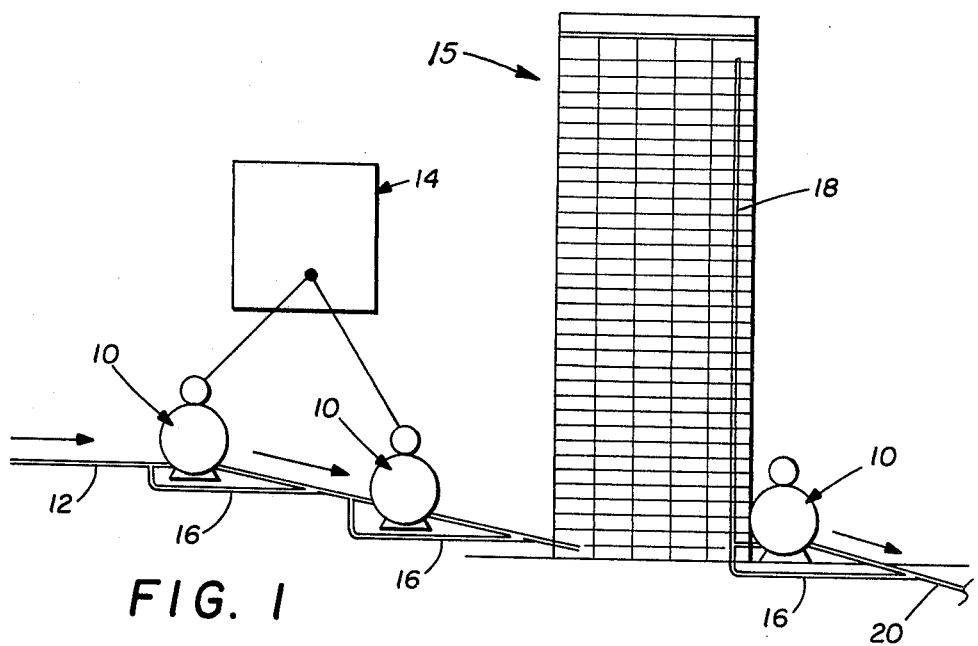
FIG. 1 is a side elevational view of two hydroelectric power installations of the present invention connected to a water line and a third hydroelectric power plant is energized by a sanitary sewer line.

FIG. 1 illustrates three hydroelectric power plants of the present invention, generally identified by the reference numeral 10. Two of the power plants 10 are shown driven by the hydraulic energy associated with water flowing through the water line 12 to service a highrise commercial structure 15. The electrical energy generated by these power plants 10 is transmitted to a central power distribution center 14. The distribution center 14 may include electrical storage batteries (not shown) for storing the electrical energy for subsequent distribution of the energy to the electrical distribution network. Fluid bypass lines 16 are connected to each of the power plants 10 for enabling uninterrupted service from the water line 12 during regular or emergency maintenance on the power plants 10. The third power plant 10 illustrated in FIG. 1 is energized by the flow of fluid and solid waste matter flowing through the sanitary sewer line 18 from the highrise building to a sanitary sewer discharge line 20. A bypass line 16 is also provided for allowing regular emergency maintenance to be performed on the power plant 10 without disrupting operation of sanitary sewer line 18.

While only two hydroelectric power plants 10 are illustrated connected to the water line 12, the number and placement of power plants 10 of the present invention may be selected for the most efficient generation of electricity. In addition, the size and electrical energy rating of the power plants 10 may be selected to meet the user's requirements. A power plant 10 suitable for a residential user would be smaller and have a lower power output rating than a power plant 10 for a high rise commercial building or a power plant 10 for transmitting electrical energy to a central power distribution center 14.

Figure 2:
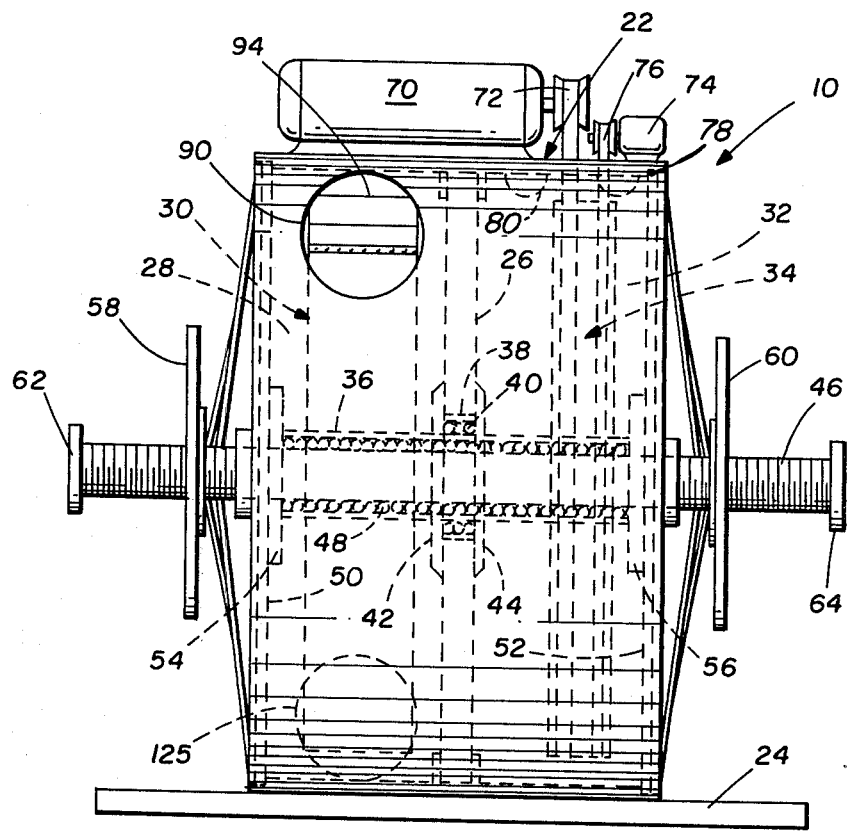
FIG. 2 is a front elevational view, partially broken away, of the hydroelectric power plant of the present invention.
Figure 3:
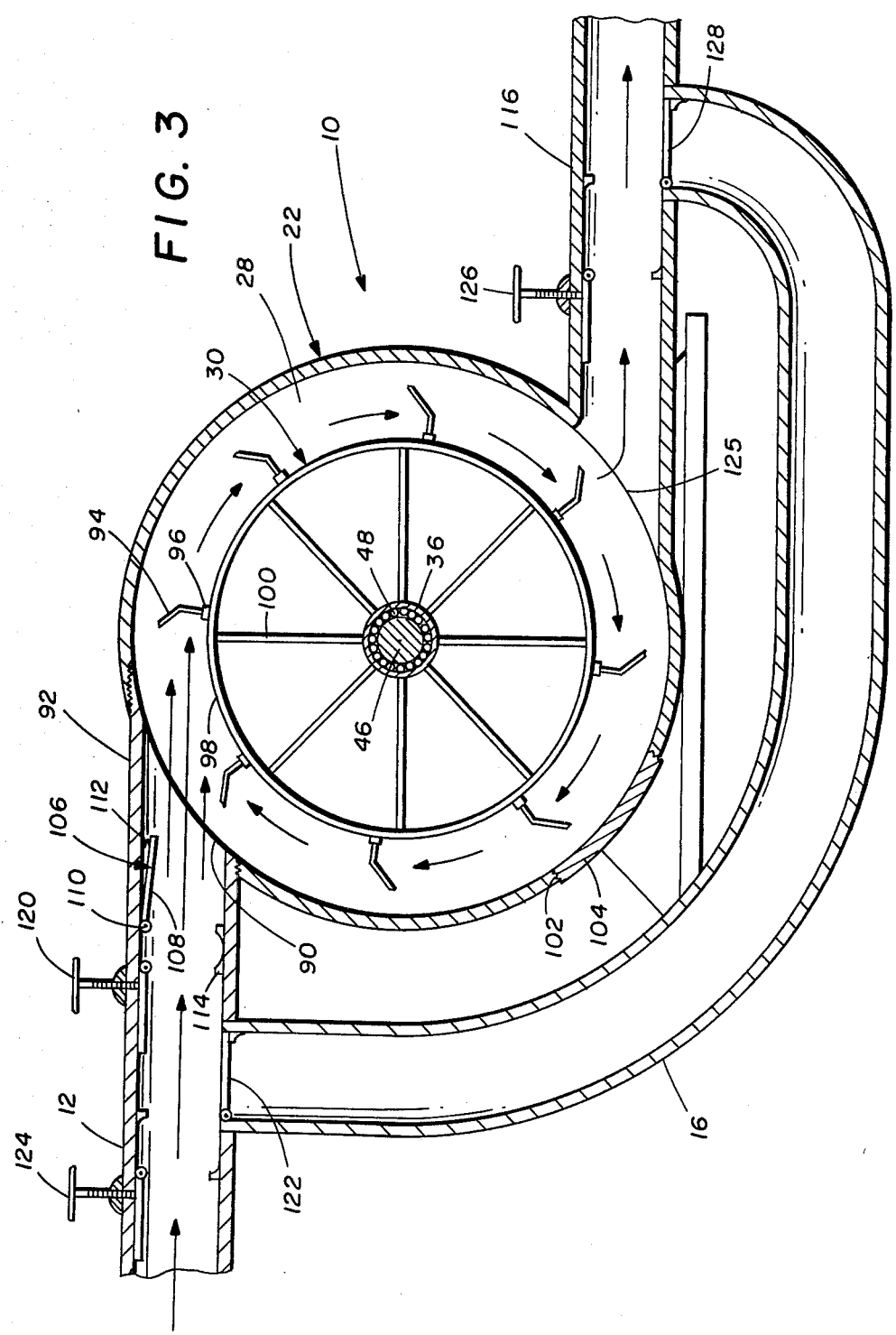
FIG. 3 is a side sectional view of a hydroelectric power plant of the present invention, including its associated bypass line.
Figure 4:
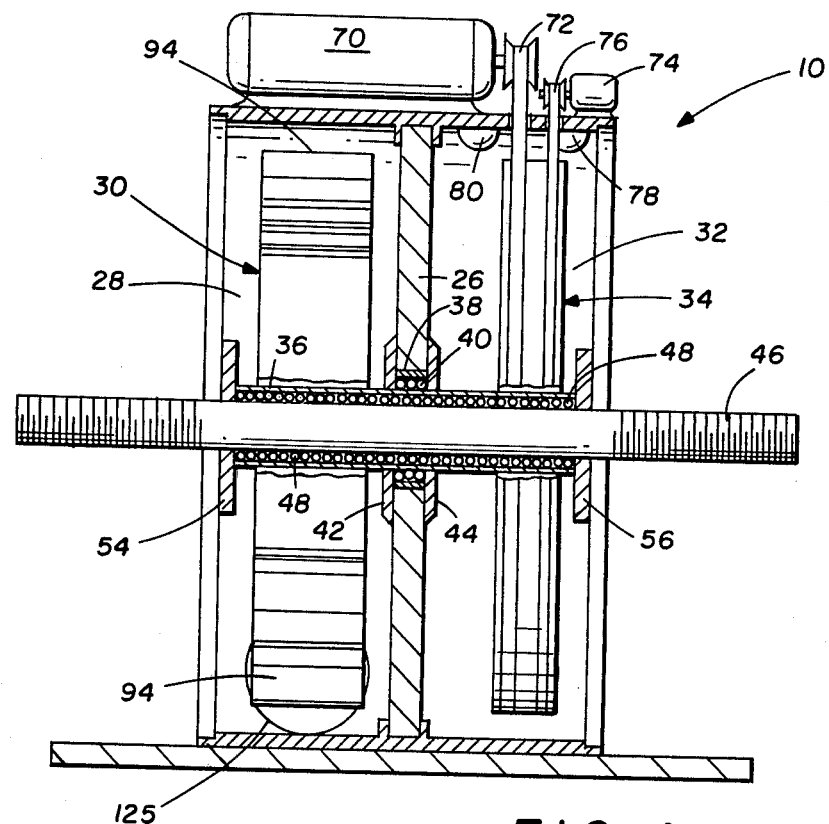
FIG. 4 is a front sectional view of the hydroelectric power plant of the present invention.

The power plant 10 of the present invention is illustrated in greater detail in FIGS. 2-4. A main housing 22 is mounted upon a support platform 24 and encloses the operating parts of the power plant 10. The interior of the housing 22 is separated by a partition 26 for defining a water turbine chamber 28 for the water turbine 30 and a drive wheel chamber 32 for the drive wheel 34. The interiors of the turbine chamber 28 and drive wheel chamber 32 may be coated with a non-corrosive material, such as baked-on porcelain.

The water turbine 30 and drive wheel 34 are supported for rotation about an axial tubing member 36 extending through an annular opening in the partition 26 between the water turbine chamber 28 and drive wheel chamber 32. The axial tubing member 36 is rotationally supported by an outer axial tubing member 38 fused to the partition 26 with a plurality of ball bearings 40 supporting the tubing member 36 for rotation. Center partition sealing plates 42 and 44 seal the ball bearings 40 within a silicone lubricant and also serve to prevent water or waste material to escape from the water turbine 30 to the drive wheel chamber 32. Tubing member 36 is in turn supported for rotation about a solid axle 46 by a plurality of ball bearings 48 sealed within the space between the axle 46 and tubing member 36 by a suitable lubricant, such as silicone. The solid axle 46 is supported at openings formed within the side walls 50 and 52 of the main housing 22. Sealing washers 54 and 56 are disposed between the ends of the tubing member 36 and housing side walls 50 and 52 for sealing the ends of the axial tubing member 36.

The ends of the solid axle 46 extending beyond the side of the main housing 22 are threaded for receiving side closing panels 58 and 60. Stop lugs 62 and 64 are removably attached to the threaded ends of the axle 46 to stop the advancement of the wheel of the side panels 58 or 60. The stop lugs 62 and 64 may be removed when it is necessary to move the side panels 58 or 60 from the main housing 22 for repair or inspection. Removal of the side panels 58 and 60 may be facilitated by the addition of guide rods extending on a side of the main housing 22 to both support and guide the covers 58 and 60 during their removal.

A main turbine electrical generator 70 is energized by means of a belt 72 which is driven by its engagement with the drive wheel 34. The main generator 70 is illustrated mounted directly to the main housing 22 of the power plant 10, but the generator 70 may be located apart from the housing 22 and yet still be energized by the drive wheel 34. The electrical output from the main generator 70 may be dedicated solely for use at a residential structure or commercial structure 15, as illustrated in FIG. 1. On the other hand, the electrical energy generated by the generator 70 of the power plant 10 may be one of several such power plants in which the output of electrical energy is transmitted to a central power distribution station 14 for storage and distribution to an electrical network energized by such station, as illustrated in FIG. 1.

An auxiliary turbine electrical generator 74 is driven by a belt 76. The auxiliary generator 74 energizes ultraviolet ray lights 78 and an ozone generator 80 mounted inside the drive wheel chamber 32 to eliminate bacteria and reduce odors. Harmful bacteria and unpleasant odors could escape into the drive wheel chamber 32 from the water turbine chamber 28 when the power plant 10 is connected to a sanitary sewer line. Of course, ultraviolet lights and ozone generators could also be mounted within the water turbine chamber 28 to improve the environmental quality of the fluid within the chamber.

FIG. 3 is a cross sectional view of the water turbine 30 and includes the inlet and outlet connections to a pipeline for directing the flow of a fluid. A threaded annular opening 90 in the upper portion of the main housing 22 has its cover plate (not shown) removed for connecting the power plant 10 with inlet pipe 92 for operating the water turbine 30 in an overshoot condition. The water turbine 30 has a plurality of vanes 94 removably attached to a flange 96 extending from the outer rim 98 of the wheel 30. The outer rim 98 is connected through spokes 100 to the tubing member 36, which is mounted upon ball bearings 48 for rotation about the solid axle 46.

A second threaded annular opening 102 is located in the lower portion of the main housing 22 and is closed by cover plate 104. The water turbine 30 of the power plant 10 may be operated in the undershoot conduct by removing the cover plate 104 and connecting the annular opening 102 to the inlet pipeline 92. In addition, the vanes 94 may be reversed for rotating the water turbine 30 in a counterclockwise direction in the undershoot condition.

The inlet pipe 92 is provided with an automatic safety valve 106 which is mounted within the pipe adjacent the opening 90. The automatic safety valve 106 includes a valve plate 108 and is attached by hinge means 110. The valve 106 is maintained in a normally open position by a coil spring 112 attached to the top of the pipe 92. A stop plate 114 is provided at the lower portion of the pipe 92 to allow the valve plate 108 to swing downwardly from the back pressure of the fluid within the water turbine chamber 28 and automatically redirect the fluid through the bypass pipe line 16 to the outlet pipe 116. A manually operated safety cutoff valve 120 is also located within the inlet pipe 92 for redirecting the flow of fluid away from the water turbine chamber 28 to the bypass pipe line 16 to allow necessary scheduled or emergency repairs to be made to the power plant 10.

A normally closed valve 122 covers the opening to the bypass pipe 16 to allow fluid flowing in the pipe 92 under normal conditions to enter the water turbine chamber 28. However, closure of the automatic safety valve 106 or the manually operated cutoff valve 120 causes sufficient back pressure to develop within the pipe line 92 to force the normally closed valve 122 to open to provide a bypass for the fluid. A normally opened safety valve 124 is also provided for cutting off the flow of fluid through the water line 12 to the power plant 10.

A second annular opening 125 is provided in the main housing 22 as the outlet opening for water exiting from the water turbine chamber. Another manual safety valve 126 is provided in the outlet pipe 116. A normally closed cutoff valve 128 closes the bypass pipe line 16 to normal operation to allow fluid to flow on through the water line 12. In the event of operation of cutoff valve 106 or 120, the fluid is directed through the bypass pipe line 16, and the valve 128 automatically swings open to provide a path for the fluid to flow on through the water pipeline 12.

Figure 5:
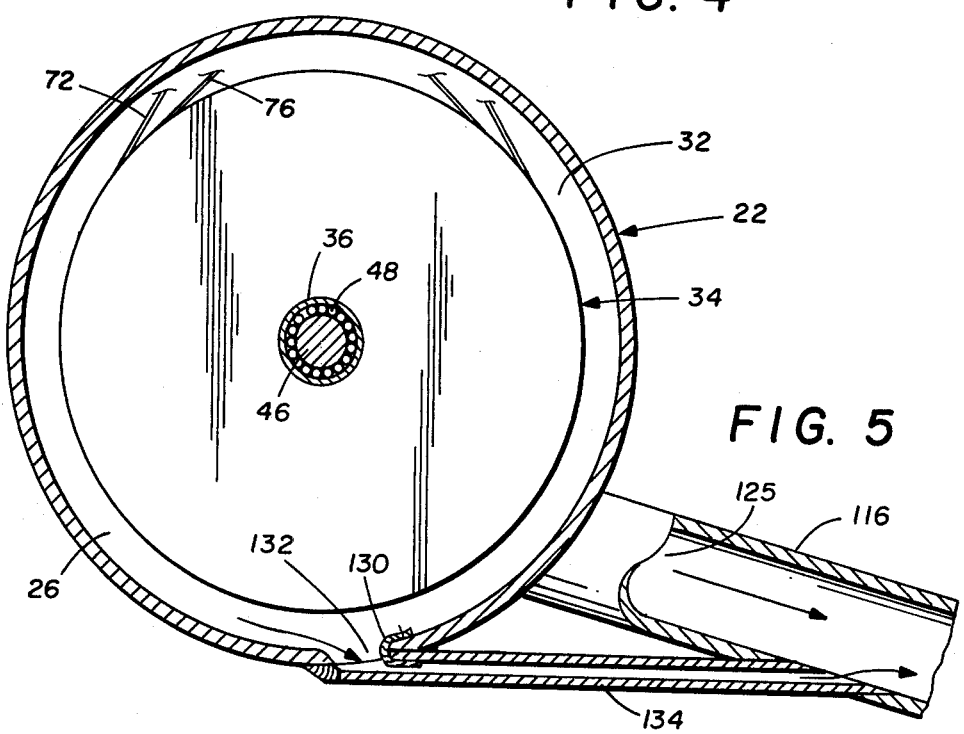
FIG. 5 is a sectional side view of the drive wheel compartment of the hydroelectric power plant of the present invention, including a drain for removing fluid from the chamber.

FIG. 5 illustrates a side view of the drive wheel chamber 32 and includes a normally open flap valve 130 located at an opening 132 within the drive wheel chamber 32 for providing a means for automatically draining any fluid escaping into the drive wheel chamber 32 through a discharge pipe 134 into the main outlet pipe 116. The normally open flap valve 130 allows fluid to flow out from the chamber 32 and automatically shuts off from a back flow condition occurring in the discharge pipe 134.

In operation, the hydroelectric power plant 10 may be inserted at various points along a water line 12 for converting the fluid energy within the pipeline to electrical energy. The power plant 10 may be connected in either the overshoot or undershoot position to direct the fluid in the pipeline to strike the vanes 94 attached to the outer rim 98 of the water turbine 30. The water turbine 30 is supported upon the tubular member 36 which extends through a partition 26 for turning the drive wheel 34. The belt 72 surrounding the drive wheel 34 converts the mechanical energy to electrical energy through the main electrical turbine generator 70. The electricity from generator 70 may either be transmitted to a central power distribution station 14 or utilized to energize electrical equipment on site with the power plant 10. A second belt 76 is driven by the drive wheel 34 to energize the auxiliary generator 74, producing sufficient electricity to energize ultraviolet light 78 and ozone generator 80 to eliminate bacteria and reduce offensive odors within the drive wheel chamber 32. Removable side closing panels 58 and 60 provide access to the water turbine chamber 28 and the drive wheel chamber 32 for repairs. A bypass pipeline 16 is provided as an alternate path for the fluid in the event of jamming occurring within the water turbine chamber 28 or the necessity to shut down the power plant 10 for necessary repairs.

Although the preferred embodiments of the invention have been illustrated in the accompanying drawings and described in the foregoing Detailed Description, it will be understood that the invention is not limited to the embodiment disclosed, but it is capable of numerous rearrangements, modifications and substitutions of parts and elements without departing from the spirit of the invention.

I claim:

1. An electric power plant for generating electrical energy from the energy of a fluid flowing within a pipeline, comprising:
   a turbine having a plurality of vanes removably secured to the outer rim of the turbine;
   a flywheel for driving an electrical generator;
   a tubular shaft connecting said turbine and said flywheel for enabling said flywheel to be driven by said turbine;
   a housing surrounding said turbine and said flywheel, said housing having a center partition for providing a first chamber for said turbine and a second chamber for said flywheel;
   a central axle extending through said tubular shaft, said axle being supported by said housing;
   means for supporting said tubular shaft passing through said partition;
   inlet openings formed through said housing for connecting the power plant to a pipeline to enable said turbine to be operated in an undershoot or overshoot condition; and
   an oulet opening formed through said housing for allowing fluid to exit from the turbine chamber.

2. The electric power plant of claim 1, wherein said inlet openings comprise first and second openings formed in said housing surrounding said first chamber housing said turbine and first and second cover plates removably secured to said first and second openings, whereby one of said cover plates may be removed for connecting the power plant to a pipeline such that the fluid in the pipeline causes the turbine to operate in an undershoot or overshoot condition.

3. The electric power plant of claim 1 and further comprising:
   an ozone generator located within said second chamber housing said flywheel; and
   an auxiliary electrical generator driven by a belt surrounding said flywheel for energizing said ozone generator, whereby harmful bacteria and odors are reduced by said ozone generator.

4. The electric power plant of claim 1 and further comprising:
   ultraviolet lights located within said second chamber housing said flywheel; and
   an auxiliary electric generator driven by a belt surrounding the said flywheel, whereby ultraviolet radiation from said ultraviolet light reduces harmful bacteria within said flywheel chamber.

5. The electric power plant of claim 1, wherein said vanes are removably secured to said turbine, whereby said vanes may be mounted upon said turbine for operating the turbine in either the undershoot or overshoot condition.

6. The electric power plant of claim 1 and further comprising a bypass pipeline extending between said inlet openings and said outlet opening to divert the flow of fluid within the pipeline around the electric power plant, whereby a mechanical breakdown or scheduled maintenance for the power plant will not interrupt operation of the pipeline.

7. The electric power plant of claim 6 and further comprising:
   a normally open automatic cutoff valve positioned within the pipeline connected to said inlet opening, such that said valve automatically cuts off the flow of fluid to said turbine upon development of a back pressure within the turbine;

a normally closed valve positioned between the pipeline and inlet of the bypass pipeline, said valve automatically opening upon closure of said normally open automatic valve; and a second normally closed valve located between the outlet of said bypass pipe and said outlet opening, said valve opening from the force of a fluid directed through said bypass pipeline.

8. The electric power plant of claim 1 and further comprising a plurality of bearings for rotationally supporting said tubing shaft upon said axle, whereby the frictional resistance to rolling between said tubing shaft and said axle is reduced.

9. The electric power plant of claim 1 and further comprising:

a plurality of bearings for rotationally supporting the outer cylindrical surface of said tubing shaft extending through said partition.

10. The electric power plant of claim 1 and further comprising:

panels removably secured to said housing whereby said panel may be removed to gain access to said first and second chambers for repairs.

* * * * *

UNITED STATES PATENT AND TRADEMARK OFFICE
CERTIFICATE OF CORRECTION

PATENT NO. : 4,272,686
DATED : June 9, 1981
INVENTOR(S) : Kunio Suzuki

It is certified that error appears in the above—identified patent and that said Letters Patent is hereby corrected as shown below:

Column 1, after "APPARATUS FOR CONVERTING HYDRAULIC ENERGY TO ELECTRICAL ENERGY" and before "BACKGROUND ART" insert

--TECHNICAL FIELD

The present invention relates to an improved water turbine for converting hydraulic energy to electrical energy, and more particularly it relates to electrical generating stations capable of being connected to existing water mains, sanitary sewer pipes and other pipelines of flowing fluids for generating electrical energy from hydraulic energy of the fluid flowing in such pipelines.--

Signed and Sealed this

Twenty-fifth Day of August 1981

[SEAL]

Attest:

Attesting Officer

GERALD J. MOSSINGHOFF

Commissioner of Patents and Trademarks